No. 620,164. Patented Feb. 28, 1899.
A. G. MUMFORD & A. ANTHONY.
VARIABLE THROW CRANK FOR VELOCIPEDES.
(Application filed Feb. 1, 1898.)
(No Model.)
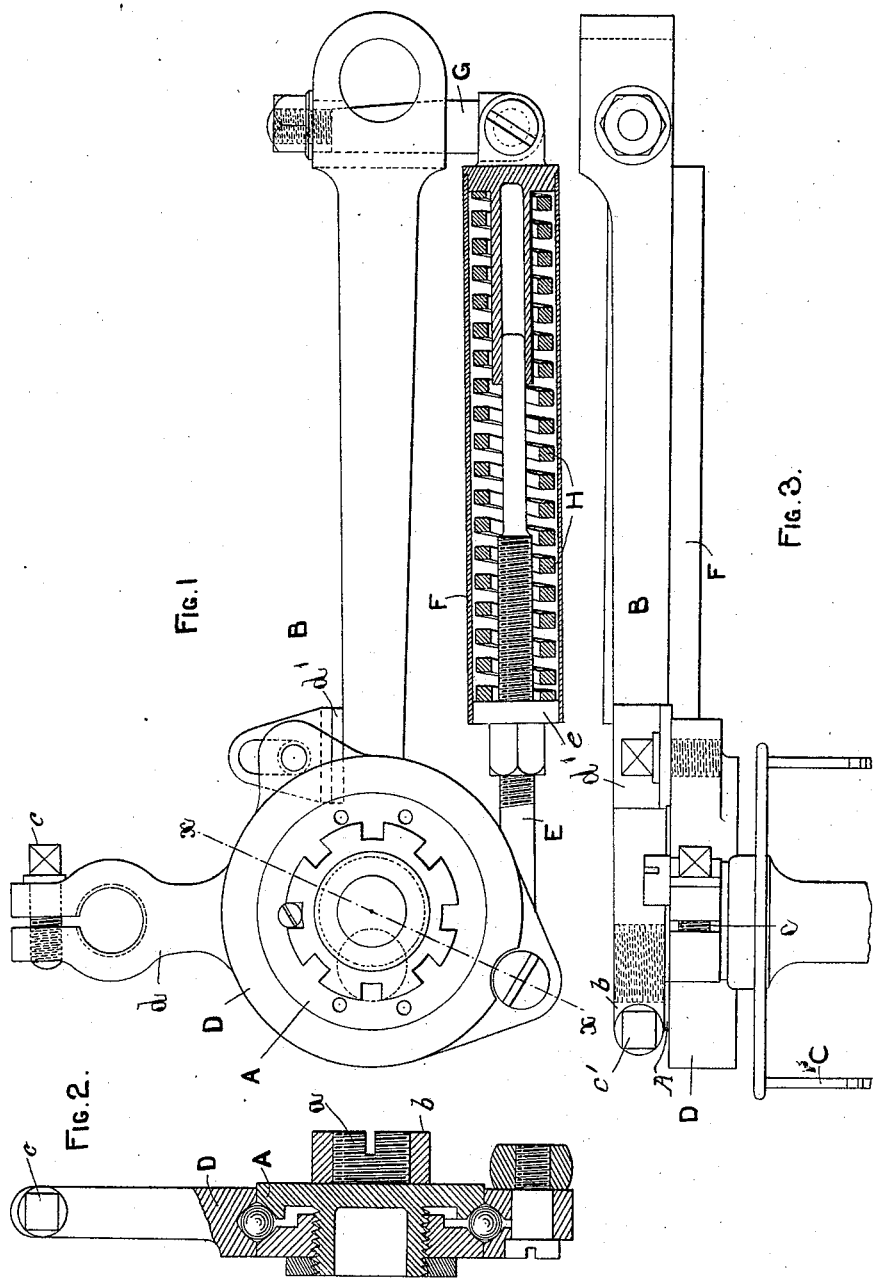
WITNESSES.
Albert G. George.
Alfred H. Croad.
INVENTOR.
Arthur George Mumford and Alfred Anthony.
per. Robert E. Phillips.
Attorney.

UNITED STATES PATENT OFFICE.

ARTHUR GEORGE MUMFORD AND ALFRED ANTHONY, OF COLCHESTER, ENGLAND.

VARIABLE-THROW CRANK FOR VELOCIPEDES.

SPECIFICATION forming part of Letters Patent No. 620,164, dated February 28, 1899.

Application filed February 1, 1898. Serial No. 668,783. (No model.)

*To all whom it may concern:*

Be it known that we, ARTHUR GEORGE MUMFORD and ALFRED ANTHONY, residing at Colchester, in the county of Essex, England, have invented a new and useful Improvement in Variable-Throw Cranks for Velocipedes, (for which we have obtained a patent in Great Britain, No. 26,636, bearing date the 15th day of November, 1897,) of which the following is a full and complete specification.

This invention relates to automatic variable-throw cranks for velocipedes; and it consists of the improved construction hereinafter more particularly specified whereby cranks of the ordinary type can be utilized, thus rendering the application of the invention more easy and less costly.

In the accompanying drawings, which illustrate the invention, Figure 1 is a view in side elevation, partly in section. Fig. 2 is a view in transverse section on line $x\,x$, Fig. 1; and Fig. 3 is a view in plan.

Throughout the views similar parts are marked with like letters of reference.

According to this invention a spring-controlled extension adapted to carry the pedal is employed which is capable of being attached to an ordinary crank. The extension consists, essentially, of a disk A, having a boss or projection $a$, which is secured to the eye $b$ of the crank B by the means ordinarily used for attaching the pedal-pin to the crank. Any approved means may be used; but the eye $b$ is preferably cut through on one side and is screw-threaded. The boss $a$ is screw-threaded and screwed into the said eye and is clamped therein by a clamping-screw, which draws the cut-through portions of the eye toward each other.

The crank shown in the accompanying drawings is one now in common use and is employed here by way of illustration only.

On the periphery of the disk A is mounted, preferably by means of a ball-bearing, another disk D, carrying an arm $d$, adapted to receive the pin of the pedal C, the means of attachment employed being a clamping-screw $c$, a similar screw $c'$ being also used for fixing the disk A to the crank. To the disk D is pivoted a rod E, carrying an adjustable collar $e$, adapted to slide in a tubular arm F, pivoted to the other end of the crank. This is conveniently effected by pivoting it to a cotter-pin G, adapted to replace the usual cotter-pin by which the crank B is fixed to its axle; but any other device, such as a clamp-bracket, may be employed. The tubular arm F carries a compression-spring H, against which the collar $e$ on the rod E engages, and so controls the movement of the disk D, carrying the pedal C. The disk D also carries an adjustable stop $d'$, adapted to engage with the crank B for the purpose of limiting the recoil of the said disk after its rotation on the disk A, giving the extension movement to the crank.

What we now claim, and desire to secure by Letters Patent, is—

1. The combination with a crank-arm, a removable pin for carrying a pedal, and means for ordinarily securing the pedal-pin direct to the crank-arm; of a disk A which is secured direct to the crank-arm by the said means in place of the pedal-pin when same is removed from the crank-arm, a second disk D journaled on the disk A and provided with a projecting arm and means for securing the pedal-pin thereto after the pedal-pin has been removed from the crank-arm, the said removable pin being interchangeable in its connection with the said crank-arm and the disk A, and a spring operatively connected with the said disk D and the crank-arm and controlling the movements of the disk D upon the disk A, substantially as set forth.

2. The combination, with a main crank-arm, of an auxiliary crank-arm pivotally connected to the free end thereof, a pedal-pin engaging with an eye in the free end of the said auxiliary crank-arm and adapted to engage with an eye in the free end of the said main crank-arm, and means for securing the pedal-pin in the respective eyes, substantially as set forth.

ARTHUR GEORGE MUMFORD.
ALFRED ANTHONY.

Witnesses:
A. H. WYATT,
F. NOBLE.